United States Patent [19]

Kubo et al.

[11] Patent Number: 5,100,937

[45] Date of Patent: Mar. 31, 1992

[54] THERMOPLASTIC RESIN COMPOSITIONS

[75] Inventors: Junichi Kubo; Atsuo Tokutake, both of Yokohama; Toshitsune Yoshikawa, Kawasaki; Osamu Kato, Yokohama, all of Japan

[73] Assignee: Nippon Oil Co., Ltd., Japan

[21] Appl. No.: 575,554

[22] Filed: Aug. 30, 1990

[30] Foreign Application Priority Data

| Aug. 31, 1989 | [JP] | Japan | 1-225468 |
| Sep. 6, 1989 | [JP] | Japan | 1-231309 |
| Oct. 5, 1989 | [JP] | Japan | 1-261195 |

[51] Int. Cl.$^5$ .............................. C08L 95/00
[52] U.S. Cl. ............................ 524/59; 524/62; 524/66; 524/70; 524/71; 524/394; 524/474; 524/481
[58] Field of Search ............ 524/59, 62, 66, 70, 524/71, 394, 451, 583, 585, 474, 481

[56] References Cited

U.S. PATENT DOCUMENTS

| 3,846,362 | 11/1974 | Reinecke et al. | 524/66 |
| 4,272,582 | 6/1981 | Kumins et al. | 428/332 |
| 4,387,175 | 6/1983 | Böhm et al. | 524/68 |
| 4,504,615 | 3/1985 | Mills | 524/291 |
| 4,764,551 | 8/1988 | Ohmae et al. | 524/394 |

OTHER PUBLICATIONS

Tetsuro Yokono et al., "Fuel", 1981, vol. 60, Jul., pp. 607-611.

*Primary Examiner*—Paul R. Michl
*Assistant Examiner*—Edward Cain
*Attorney, Agent, or Firm*—Bruce L. Adams; Van C. Wilks

[57] ABSTRACT

A thermoplastic resin composition comprising a thermoplastic resin (A) and a hydrogen donative material or Component (B) added in an amount of 0.01-40 weight parts per 100 weight parts resin (A), the hydrogen donative material having a transfer of hydrogen or at least 0.1 (hydrogen atoms/molecules anthracene). The composition further incorporates metal salts of aliphatic acid and/or hydrotalcites and a selected class of oxidation inhibitors.

10 Claims, No Drawings

THERMOPLASTIC RESIN COMPOSITIONS

BACKGROUND OF THE INVENTION

1. Field of the Invention

This invention relates to thermoplastic resin compositions suitable for continuous high-speed molding.

2. Prior Art

Speedier production of molded articles from thermoplastic resinous materials is nowadays most essential to cope with ever increasing demand in many industrial sectors. The manufacture for example of monofilaments from olefinic polymers by extension has been sped up from a conventional rate of 100 meters per minute to a modern rate of 150-180 meters. This may be achieved literally by increasing the molding temperature and at the same time the shearing speed, but this would give rise to deterioration by heat of certain thermoplastic resins such as a linear chain low density polyethylene moldable at 200°-250° C. (compared to 140°-160° C. for molding high-pressure low density polyethylene by for example a film extrusion). The problem of thermal deterioration is also associated with certain other types of thermoplastic resins which are so easily plasticizable at low temperature, or which have their intrinsic thermal decomposition temperature approximating their melting and plasticizing temperature, typical examples of such thermoplastic resins being polyamides moldable at 250°-300° C.

Engineering plastics materials moldable at even higher temperature (300°-400° C.) such as liquid crystal polymers including aromatic polyesters, polyphenylenesulfides and the like are likewise regarded problematic in terms of thermal deterioration.

In the case of the manufacture of monofilaments from polyethylene polymer, its deterioration by heat would invite a cross-linking gelation causing draw or extrusion breaks in the monofilament run, and in the case of propylene polymer, thermal deterioration thereof would appear in flow or denier irregularities.

To cope with the above problems of thermal deterioration, it has been proposed to use various oxidation inhibitors such as for example hindered phenol and amines which are effective in capturing free radicals emanating from broken or dissociated molecules at an initial stage of deterioration. More specifically, such radicals are captured by H in the phenolic OH or aminic NH of the respective inhibitor. However, such conventional oxidation inhibitors are susceptible to volatilization at high temperature and hence their ability would decline during ordinary molding of thermoplastic materials and under severe temperature or shearing conditions.

Phosphor-based oxidation inhibitors are also known for use in eliminating discolorization of molded articles such as monofilaments, but are less effective in oxidation inhibiting performance than phenol-based inhibitors.

Olefinic polymers made available with use of highly active Ziegler-type catalysts have residual catalyst components such as halogen compounds which tend to deteriorate the resin, corrode the molds or otherwise produce objectionable gum or white powder during molding of the polymer.

SUMMARY OF THE INVENTION

With the foregoing problems of the prior art in view, the present invention seeks to provide a class of thermoplastic resin compositions which are free from deterioration by heat during molding and under severely high shearing speed and/or high temperature conditions.

The invention further seeks to provide another class of thermoplastic resin compositions which are immune to thermal deterioration as well as to generation of objectionable gum or white powder during molding of the resin.

The invention also seeks to provide a further class of thermoplastic resin compositions which are free from deterioration by heat during molding and under severely high shearing speed and/or high temperature conditions as well as from deterioration by light upon irradiation with X-rays and ultraviolet rays.

According to the invention, there is provided a thermoplastic resin composition which comprises 100 parts by weight of a thermoplastic resin (A) and 0.01-40 parts by weight of a hydrogen donative material selected from at least one of Components (B) of the group consisting of hydrogenated oils [I] resulting from hydrogenation of coal tar or fractionates thereof, petroleum oil fractions [II] boiling at above 200° C. produced by thermal cracking, catalytic cracking or catalytic reforming, hydrogenated pitches [III] boiling at 160°-550° C. resulting from hydrogenation of petroleum heavy oil and/or petroleum heavy oil having undergone a primary heat treatment, and fractions [IV] boiling at 160°-550° C. of hydrogenated pitches [III] having undergone a secondary heat treatment.

DETAILED DESCRIPTION OF THE INVENTION

The term thermoplastic resins as used herein includes polyolefin resins such as copolymers of ethylene and vinyl acetate, copolymers of ethylene and acrylic or methacrylic acid or its derivatives and the like, polyacrylic resins, polystyrene resins, polyvinyl chloride resins, polyvinylidene chloride resins, polyamide resins, polyester resins, polycarbonate resins, fluorine resins, polyacetal resins, polyphenylene ether resins, crystalline polymers such as polyphenylene sulfides, polyether sulfones, polysulfones, polyether ether ketones, polyacrylates, wholly aromatic polyesters and the like, polyimide resins, polyaramid resins and the like.

Olefinic polymers polymerizable by highly active Ziegler-type catalysts and highly crystalline ethylene copolymer and/or propylene copolymers inter alia are most suitably used in for example high speed monofilament molding, or where high heat resistance is required or continuous molding operation is desirable.

The term hydrogen donative material or hydrogen donor as used herein designates a hydrogenated oil resulting from hydrogenation of at least one of the starting oils including coal tar or fractionates [I] thereof, and petroleum oil fractions [II] boiling at above 200° C. produced by thermal cracking, catalytic cracking or catalytic reforming. Specific examples of oil [I] include treated oil, anthracene oil, tar oil, tar gas oil, carvol oil, naphthalene oil, pitch oil, creosote oil and liquefied coal oil either alone or in combination.

Examples of oil [II] include thermally cracked naphtha residue, cycle oil generating from catalytic cracking apparatus (FCC apparatus), slurry oil, decanted oil (DCO), catalytically reformed naphtha residue, thermally cracked crude oil tar and their combinations.

The procedure of hydrogenating the above oils [I] and [II] is optional, but may be usually performed with use of hydrogen gas in the presence of a catalyst having a hydrogenating function. This catalyst may be any known catalyst widely used for hydrogenating petroleum fractions, and specific examples of such catalyst include a catalyst obtained by depositing a sulfide or oxide of at least one metal selected from Groups V--VIII metals, preferably nickel, cobalt, molybdenum, vanadium and tungsten, on an inorganic carrier such as of alumina, cation-exchanged zeolite or the like, or a catalyst of a type having an aromatic ring nucleus-hydride and resulting from supporting a metal such as nickel, nickel oxide, nickel-copper, platinum, platinum oxide, platinum-rhodium, platinum-lithium, rhodium, palladium, cobalt, Raney cobalt, ruthenium or the like on an inorganic carrier such as for example of active carbon, alumina, silica-alumina, diatomaceous earth or zeolite.

Petroleum fractions as the starting oil are hydrogenated in the presence of any of the above catalysts having a hydrogenating function preferably at a temperature of 300°–400° C. at an atmospheric pressure of 30–150 or in the presence of an aromatic nucleus hydrogenation catalyst preferably at 150°–300° C. and at 30–150 atmospheric.

The reactor for hydrogenation may be of an ordinary fixed bed type.

To eliminate the tendency of the resin becoming deteriorated during molding, it is necessary to retain the hydrogen donor, without being volatilized, in a molten phase in the resin and to allow it to discharge sufficient hydrogen to capture free radicals or polymer radicals which may emanate during the reaction or kneading of the resin composition.

The above [I], [II], [III] and [IV] oils all contain large proportions of such compounds which have dicyclic or greater aromatic rings, or which have a monocyclic aromatic ring and an unsaturated 5-member ring, or mixtures thereof. Therefore, hydrogenation of such starting oils provides a hydrogen donative material which can readily discharge hydrogen during high shearing, high temperature molding of the resin. Initial fractions above 200° C. among the starting oils specified herein, when hydrogenated, are particularly free from volatilization at elevated temperatures.

The hydrogen donor contemplated under the invention is a material having a hydrogen transfer of at least 0.1 at 350° C. (hydrogen atoms/molecule anthracene) as determined by the amount of hydrogen captured by a hydrogen acceptor. A sample of hydrogen donor is reacted with a hydrogen acceptor such as anthracene under a set of conditions, the amount of the acceptor thereby hydrogenated being determined by for example gas chromatography. More specifically, the donor and the acceptor in a ratio by weight of ½ may be reacted in an autoclave equipped with stirrer under a set of conditions tabulated below.

TABLE 1

| Reaction temperature | 350° C. |
|---|---|
| Reaction pressure | 50 kg/cm² (N₂ pressure) |
| Reaction time | 30 minutes |
| Catalyst | none |
| Reactor | 1 liter autoclave with electromagnetic stirrer |
| Donor/Accepter | 1/2 (by weight ratio) |

After the reaction, the amounts of 9,10-dihydroanthracene, 1,4,5,8-tetrahydroanthracene, 1,4,5,8,9,10-hexahydroanthracene, 1,2,3,4,5,6,7,8-octahydroanthracene and residual anthracenes were determined by gas chromatography. This procedure was based on the teaching by Yokono T., Marsh H. & Yokono M., Fuel, 60, 607 (1981).

The term petroleum heavy oil referred to herein according to the invention includes heavy oil fractions boiling at above 200° C. obtained by steam cracking or catalytic cracking of petroleum oils, decanted oil (DCO) and heavy cycle oil (HCO). Such heavy oil boiling at above 200° C. are available from fractionates boiling substantially at 200°–450° C. byproduced in the manufacture of ethylene, propylene and other olefinic hydrocarbons resulting from steam cracking of naphtha, kerosene or light oil. Another heavy oil boiling at above 200° C. finds its source from fractionates boiling at 200°–450° C. byproduced in the manufacture of gasoline and other light oil products resulting from catalytic cracking of kerosene, light oil or topped crude in the presence of naturally occurring or synthetic silica-alumina or zeolite catalysts at 450°–550° C. and under atmospheric $-20$ kg/cm²·G.

The term coal-based heavy oil used according to the invention includes coal tar or distillates thereof (such as creosote) boiling at above 200° C.

According to the invention, the above heavy oils are subjected to a primary heat treatment at a temperature of 350°–480° C., preferably 380°–450° C., and at a pressure of 2–50 kg/cm², preferably 5–40 kg/cm² for a time length of 15 minutes to 20 hours, the resulting pitch normally softening at 40°–150° C. In this instance, if necessary, light oil fractions may be removed for example by distillation. The pitch is then hydrogenated in the presence of suitable hydrogenation catalysts such as a catalyst composed of a catalyst component chosen from a Group IB metal such as copper, a Group VIB metal such as chromium or molybdenum or a Group VIII metal such as cobalt, nickel, palladium or platinum in the form of a sulfide or oxide and an inorganic carrier such as bauxite, active carbon, diatomaceous earth, zeolite, silica, titania, zirconia, alumina or silca gel.

The hydrogenation reaction though dependent upon the type of catalyst used is affected usually at a temperature of 120°–450° C., preferably 200°–380° C., at a pressure of 20–180 kg/cm²·G, preferably 40–150 kg/cm²·G, and for a time length of 0.5–3 hours by batch operation, or at LHSV of 0.1–3.0, preferably 0.2–1.5, by continuous operation.

The aromatic nuclei of the aromatic hydrocarbons in the heavy oil fraction are partially hydrogenated during the above reaction at a rate of 10%–85%, preferably 20%–70%. This hydrogenation rate is defined by the formula $$\text{Hydrogenation Rate} = \frac{\begin{array}{c}\text{Aromatic Ring} \\ \text{Carbon Number} \\ \text{Prior to} \\ \text{Hydrogenation}\end{array} - \begin{array}{c}\text{Aromatic Ring} \\ \text{Carbon Number} \\ \text{After} \\ \text{Hydrogenation}\end{array}}{\begin{array}{c}\text{Aromatic Ring Carbon Number} \\ \text{Prior to Hydrogenation}\end{array}}$$

wherein the aromatic ring carbon number is indicated in ASTM D-2140-66.

The resulting hydrogenated pitch [III] normally has a softening point of 10°–80° C. and can be used per se as Component (B) of the thermoplastic resin compositions of the invention, or may be preferably further distilled to yield fractions boiling at 160°–550° C., preferably 200°–550° C. for use as Component (B).

According to the invention, the above hydrogenated pitch may be further subjected to a secondary heat treatment to give fractions [IV] boiling at 160°-550° C., preferably 210°-550° C., for use as Component (B). The secondary heat treatment is carried out by passing the hydrogenated pitch [III] through N₂, Ar, He, Xe and other gas or vapor inert to the pitch in vacuum of about 0.1-500 mmHg at 340°-450° C., preferably 370°-410° C. Treatment time length is dependent upon temperature, rate of the pitch passing through the inert gas or vapor and other parameters, but ranges usually from 36 minutes to 50 hours, preferably 1-40 hours. The rate of inert gas or vapor flow may be chosen according to the type of reactor used.

The fractions [IV] to be used as Component (B) boiling at 160°-550° C. are obtained from top distillates of the reactor during the secondary heat treatment or by further distillation of the heat-treated fractions. The pitch [IV] made available from the secondary heat treatment can be readily used as a starting material for carbon fibers and the like.

The hydrogen donor or Component (B) is added in an amount of 0.01-40, preferably 0.1-20 weight parts per 100 weight parts of the thermoplastic resin (A). For olefinic polymers used as the Resin (A), the amount of Component (B) to be added is 0.01-10 weight parts, preferably 0.1-5 weight parts. Amounts smaller than 0.01 weight parts would bear no significant results and larger than 40 weight parts would provide no proportionally greater effect but rather render the hydrogen donor incompatible with the resin, and the kneading thereof difficult and further cause bleeding.

It has been found further advantageous according to the invention to use an additive or Component (C) including metal salts of aliphatic acids and/or hydrotalcites, which additive contributes to prevention of deterioration of the resin during molding. The metal salts of aliphatic acids; namely, one of Components (C), exemplarily includes salts derivable from aliphatic acids such as lauric, myristic, palmitic, stearic, oleic, linoleic, linolenic and like acids and metals such as lithium, sodium, magnesium, calcium, zinc and the like. These additives absorb halogen remaining as catalyst residues in the olefinic polymer, thereby serving to eliminate breaks in drawn monofilament or such gum deposits in the molds which would break the monofilament. This problem is pronounced when extruding colored monofilaments, can be overcome by the use of Component (C) preferably together with some aliphatic acid which serves to reduce the friction between the resin melt and the mold.

Another Component (C); namely, hydrotalcites, is a complex salt compound of the formula

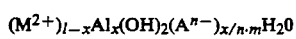

$$(M^{2+})_{1-x}Al_x(OH)_2(A^{n-})_{x/n} \cdot mH_2O$$

where $0 < x \leq 0.5$, m is real number, $M^{2+}$ is Mg, Ca or Zn, and $A^{-n}$ is cation of n valance.

The above complex salt compounds may be naturally occurring or synthetic, but are preferably with Mg as $M^{2+}$ and $Co_3^{2-}$ as $A^{n-}$. Hydrotalcites have greater halogen absorbing ability than aliphatic acid metal salts but cannot for themselves act to preclude gumming or white dusts which may be found in the mold. However, a combined use of hydrotalcites and metal salts of aliphatic acids even in a relatively small amount provides a synergistic effect in the elimination of resin deterioration, mold corrosion and generation of gum and white dust which would otherwise take place due to the attack of halogen.

The above Component (C) is added in an amount of 0.01-5, preferably 0.1-3 weight parts per 100 weight parts of olefinic polymer. Smaller amounts than 0.01 weight part would fail in halogen absorption and lead to monofilament draw breaks. Larger amounts than 5 weight parts in the case of metal salts of aliphatic acids or mixtures of these and aliphatic acid would lead to irregular resin flow in the extruder and in the case of hydrotalcites would result in opaque molded articles or draw breaks analogous to a phenomenon of foreign matter intervention.

According to the invention, the thermoplastic resin compositions further incorporate an oxidation inhibitor or Component (D) which are conducive to the prevention of deterioration by heat of the resin over a wide range of temperatures. Eligible oxidation inhibitors as Component (D) of the invention include phenol-based antioxidants such as for example triethyleneglycolbis[3-(3-t-butyl-5-methyl-4-hydroxyphenyl)propionate], n-octadecyl-3-(3',5'-di-t-butyl-4'-hydroxyphenyl)propionate, tetrakis-[methylene-3-(3',5'-di-t-butyl-4'-hydroxyphenyl)propionate]methane, 1,3,5-trimethyl-2,4,6-tris-(3,5-di-t-butyl-4-hydroxybenzyl)benzene, tris(3,5-di-t-butyl-4-hydroxybenzyl)isocyanurate, N,N'-hexamethylene-bis(3,5-di-t-butyl-4-hydroxyhydrocyanamide and the like.

Amine-based antioxidants include for example octyldiphenylamine, 2,4-bis(n-octylthio)-6-(4-hydroxy-3,5-di-t-butylalinino)-1,3,5-triazine, phenyl-1-naphthylamine, poly(2,2,4-trimethyl-1,2-dihydroquinoline, N,N'-diphenyl-p-phenylenediamine and the like.

Sulfur-based antioxidants include for example dilaurylthiodipropionate, distearylthiopropionate, pentaerythritol-tetrakis-(β-lauryl-thipropionate) and the like.

Phosphorus-based antioxidants include for example tris(2,4-di-t-butylphenyl)-phosphite, tetrakis(2,4-di-t-butylphenyl)-4,4'-biphenylenephosphonite, di(2,4-di-t-butylphenyl)-pentaerythritoldiphosphite, trisnonylphenylphosphite, diphenylisooctylphosphite, tetratridecyl-4,4'-butylidene-bis(3-methyl-6-t-butylphenyl)diphosphite and the like.

The oxidation inhibitors are added in an amount of 0.01-20, preferably 0.05-10, weight parts per 100 weight parts of the thermoplastic resin. Departure from this range of addition would serve no useful purposes. When using an olefinic polymer as Component (A), the oxidation inhibitors or Component (D) should be added in an amount of 0.01-5 weight parts, preferably 0.05-3 weight parts. Less than 0.01 weight part would not be sufficient to provide a synergistic effect with the hydrogen donor, and more than 0.5 weight part would only result in objectionable discoloration of the molded article. Two or more of the above listed oxidation inhibitors may be used simultaneously and any of them may be also combined if necessary with light stabilizers such as benzotriazoles, benzophenones, salicylates, nickel complex salts and hindered amines, heavy metal inactivators, metallic soaps, nucleating agents, plasticizers, organic tin compounds, flame retardants, antistatic agents, lubricants, antiblocking agents, fillers, foaming agents, crosslinking agents, rubbers and like.

The invention will be further described by way of the following examples which are however given as illustrative but not limiting the invention thereto.

DETERIORATION TEST

The test for determining the performance or ability of preventing thermal deterioration in each of the examples was conducted by kneading the admixtures of specified thermoplastic resins and additives in preheated laboratory mill operated at 30 r.p.m., and torque changes in the mill were checked. The length of time, i.e. induction period, for cross-linking deteriorative polymers such as ethylenic polymers to take until a rapid rise in the torque appears was considered as an index of thermal deterioration. This induction period in the case of deteriorative polymers such as propylene polymers was the time consumed up till the initial torque had declined 20%.

TEST FOR CONTINUOUS MONOFILAMENT MOLDING OPERATION

A 65 mm$\phi$ extruder was used under the following conditions.

| $C_1$ | $C_2$ | $C_3$ | $C_4$ | $D_1$ | $D_2$ |
|---|---|---|---|---|---|
| 200 | 260 | 280 | 310 | 300 | 300 |

| | |
|---|---|
| Nozzle: | 0.8 mm diameter × 8 mm length |
| Strand: | 150 |
| Yarn: | 350 denier |
| Drawing Speed: | 120 m/min. |
| Draw ratio: | 10 times |

The number of breaks in drawn monofilament was measured.

TEST FOR GUMMING

A 40 mm$\phi$ extruder was operated for 2.5 hours under the following conditions, and the amount of gum deposits (mg/2.5 hrs.) in the mold was measured.

| $C_1$ | $C_2$ | $C_3$ | $D_1$ | $D_2$ |
|---|---|---|---|---|
| 150 | 180 | 220 | 250 | 250 |

| | |
|---|---|
| Nozzle: | 1.5 mm diameter × 7.5 mm length |
| Strand: | 8 |
| Speed of First Roll: | 3 m/min. |

HYDROGENATION OF STARTING OIL [I]

Anthracene and creosote oils as the examples of coal tar and its fractionates [I] were subjected to hydrogenation under the conditions shown in Table 2, and the resulting hydrogenated oils were checked for their hydrogen donative capabilities in the manner above described. Their respective amounts of hydrogen transfer to anthracene were 0.40 and 0.45 (H atom/mol anthracene). For the sake of comparison, kerosene as an example of non-hydrogen donative oil was also checked for hydrogen transfer to anthracene, which was only 0.027 (H atom/mol anthracene).

HYDROGENATION OF STARTING OIL [II]

Catalytically reformed residual oil and naphtha cracking residual oil, both examples of petroleum oil fractions [II], were hydrogenated under the conditions of Table 2 and determined for hydrogen transfer to anthracene to be 0.33 and 0.36, respectively.

TABLE 2

| | |
|---|---|
| Reaction temperature | 370° C. |
| Reaction pressure | 75 kg/cm$^2$ (N$_2$ pressure) |
| LHSV | 1.0 |
| Catalyst | Co—Mo—A$_2$lO$_3$ (commercially available desulfurized catalyst) |
| Reactor | Fixed bed with downward flow communication |

PREPARATION OF HYDROGENATED PITCH [III]

Vacuum distillates (VGO) Arabian crude oil were hydrogenated and catalytically cracked in the presence of a silica.alumina catalyst at 500° C. to give fractions (DCO) boiling at above 200° C. The resulting heavy oil was subjected to a primary heat treatment at a pressure of 15 kg/cm$^2$·G and a temperature of 400° C. for three hours. The thus treated oil was distilled at 250° C. and at 1.0 mmHg to remove light fractions, thereby providing a pitch having a softening point of 83° C. This pitch was contacted with hydrogen at LHSV of 0.25 at 135 kg/cm$^2$·G and at 350° C. in the presence of nickel molybdenum catalyst (NM-502). The hydrogenated pitch was distilled at 210° C. and at 1.0 mmHg to give fractions boiling at 160°–550° C. The resulting Component (B) here is referred to specifically as Component (B1).

PREPARATION OF HYDROGENATED PITCH [IV]

The pitch [III] or Component (B1) obtained as above was subjected to a secondary heat treatment in which it was stirred in nitrogen atmosphere at 380° C. for 20 hours to give a heavy oil fractionating with nitrogen gas and boiling at 200°–550° C. The resulting oil fraction is referred to herein specifically as Component (B2) contrastive to Component (B1).

INVENTIVE EXAMPLES 1–3 AND COMPARATIVE EXAMPLES 1–2

A linear chain low density polyethylene with no additives (MFR 1.0 g/10 min., density 0.922 g/cc) was admixed with the anthracene hydrogenated oil prepared in the hydrogenation of starting oil [I], or a phenol-based oxidation inhibitor (D) and tested for the performance of anti-thermal deterioration in oxygen atmosphere at different heating temperatures, with the results shown in Table 3.

INVENTIVE EXAMPLES 4–5 AND COMPARATIVE EXAMPLES 3–4

The same test samples as used in Inventive Examples 1–3 and Comparative Examples 1–2 were tested for the performance of anti-thermal deterioration in nitrogen atmosphere, with the results shown in Table 4. The performance is comparable to the phenol oxidation inhibitor up to 190° C. The anthracene hydrogenated oil is outstandingly stable at 210° C.

INVENTIVE EXAMPLES 6–7 AND COMPARATIVE EXAMPLES 5–6

A high density polyethylene with no additives (MFR 0.80 g/10 min., density 0.950 g/cc) was admixed with the creosote hydrogenated oil prepared by the hydrogenation of starting oil [I] and a phenol-based oxidation inhibitor (D) and tested for anti-thermal deterioration performance in nitrogen atmosphere, with the results shown in Table 5.

INVENTIVE EXAMPLE 8 AND COMPARATIVE EXAMPLES 7–8

A non-additive homopropylene (MFR 0.5 g/10 min.) was admixed with the naphtha cracking hydrogenated residual oil obtained from the hydrogenation of starting oil [II] and the phenol-based oxidation inhibitor (D) and tested in nitrogen atmosphere, with the results shown in Table 6.

INVENTIVE EXAMPLES 9–10 AND COMPARATIVE EXAMPLES 9–10

A polyester resin dried at 120° C. for four hours was admixed with the hydrogenated anthracene oil obtained from the hydrogenation of starting oil [I] and an oxidation inhibitor (D) and tested in nitrogen atmosphere in a manner similar to the foregoing examples, with the results shown in Table 7.

INVENTIVE EXAMPLES 11–12 AND COMPARATIVE EXAMPLES 11–12

A linear chain low density polyethylene with no additives (MFR 1.0/10 min., density 0.922 g/cc) was admixed with a hydrogenated pitch [III], i.e. Component (B1), and a phenol-based oxidation inhibitor (D) and tested for the performance of anti-heat deterioration of the resin in oxygen atmosphere at different temperatures, with the results shown in Table 8. Inventive Example 11 including Component (B1) and Inventive Example 12 including both Component (B1) and the oxidation inhibitor (D) are particularly indicative of high temperature stability.

INVENTIVE EXAMPLES 13–14 AND COMPARATIVE EXAMPLES 13–14

Similar samples to those used in the above Examples 11–12 were tested in nitrogen atmosphere with the results shown in Table 9.

INVENTIVE EXAMPLES 15–16 AND COMPARATIVE EXAMPLE 15

A high density polyethylene with no additives (MFR 0.80 g/10 min., density 0.950 g/cc), Component (A), was admixed with hydrogenated pitch [IV], i.e. Component (B2), the resulting admixture being formed by a hot press into a sheet 2 mm thick. This sheet was tested for draw ratio (%) at break point by irradiation to Co 60 rays at a rate of 0.9 Mrad/hr. in normal atmosphere, with total 1, 2.5 and 5 Mrads, respectively. Test results are shown in Table 10.

INVENTIVE EXAMPLES 17–18 AND COMPARATIVE EXAMPLE 16

A non-additive polypropylene (MFR 0.5 g/10 min.) was used as Component (A) are admixed with Component (B2). The resulting sample was exposed to ultraviolet rays for measuring its break point draw ratio with the results shown in Table 11.

INVENTIVE EXAMPLES 19–20 AND COMPARATIVE EXAMPLES 17–18

A polyester resin dried at 120° C. for four hours was used as Component (A) and was admixed with Component (B1) and oxidation inhibitor (D). The resulting admixtures were tested for anti-thermal deterioration in nitrogen atmosphere, with the results shown in Table 12.

INVENTIVE EXAMPLES 21–23 AND COMPARATIVE EXAMPLE 19

A non-additive high density polyethylene (MFR 0.7 g/10 min., density 0.958 g/cc) was used as Component (A) and admixed with anthracene hydrogenated oil as Component (B), and calcium stearate, hydrotalcite or a mixture of calcium stearate and stearic acid. The admixture was drawn into a monofilament, which was tested for thermal stability, draw breaks and gumming with the results shown in Table 13.

INVENTIVE EXAMPLES 24–26

Similar compositions to those in Examples 21–23 were used excepting that naphtha cracked oil as Component (B) and oxidation inhibitor (D) were added. The resulting admixture was tested with the results also shown in Table 13.

INVENTIVE EXAMPLES 27–30 AND COMPARATIVE EXAMPLE 20

A dry blend of non-additive polypropylene and non-additive high density polyethylene was used as Component (A) and admixed with creosote hydrogenated oil, as Component (B), and calcium stearate and hydrotalcite as Component (C). Test results of the resulting monofilament are shown in Table 14.

TABLE 3

|  |  | 160° C. | | 190° C. | | 210° C. | |
| --- | --- | --- | --- | --- | --- | --- | --- |
|  | Additive | quanitity (%) | induction period | quanitity (%) | induction period | quanitity (%) | induction period |
| Inventive Example 1 | HAO | 0.5 | 26'36" | 0.5 | 20'18" | 0.5 | 6'00" |
| Inventive Example 2 | HAO | 1.0 | 52'12" | 1.0 | >60' | 1.0 | >60' |
| Inventive Example 3 | HAO/oxidation inhibitor (D) | 0.5/0.05 | >60' | 0.5/0.05 | 27'12" | 0.5/0.05 | 10'48" |
| Comparative Example 1 | none | — | 4'36" | — | 5'12" | — | 3'36" |
| Comparative Example 2 | oxidation inhibitor (D) | 0.05 | 6'18" | 0.05 | 4'42" | 0.05 | 4'12" |

Note
HAO: Hydrogenated anthracene oil
Oxidation inhibitor (D): 2.6 di-butyl-4-methylphenol

TABLE 4

| | Additive | 160° C. quanitity (%) | 160° C. induction period | 190° C. quanitity (%) | 190° C. induction period | 210° C. quanitity (%) | 210° C. induction period |
|---|---|---|---|---|---|---|---|
| Inventive Example 4 | HAO | 0.5 | >60' | 0.5 | >60' | 0.5 | >60' |
| Inventive Example 5 | HAO | 1.0 | >60' | 1.0 | >60' | 1.0 | >60' |
| Comparative Example 3 | none | — | 39'36" | — | 5'12" | — | 3'42" |
| Comparative Example 4 | oxidation inhibitor (D) | 0.05 | >60' | 0.05 | >60' | 0.05 | 12'48" |

Note
HAO: Hydrogenated anthracene oil
Oxidation inhibitor (D): 2.6 di-butyl-4-methylphenol

TABLE 5

| | Additive | 190° C. quanitity (%) | 190° C. induction period | 230° C. quanitity (%) | 230° C. induction period | 250° C. quanitity (%) | 250° C. induction period |
|---|---|---|---|---|---|---|---|
| Inventive Example 6 | HAO | 1.0 | >60' | 0.5 / 1.0 | 12'18" / >60' | 1.0 | >60' |
| Inventive Example 7 | HAO/oxidation | 0.5/0.05 | >60' | 0.5/0.05 | 46'00" | 0.5/0.05 | 10'48" |
| Comparative Example 5 | none | — | 5'42" | — | 3'54" | — | 2'42" |
| Comparative Example 6 | oxidation inhibitor (D) | 0.1 | 43'00" | 0.1 | 7'05" | 0.1 | 3'30" |

Note
HAO: Hydrogenated anthracene oil
Oxidation inhibitor (D): Pentaerythtyl-tetrakis[3-(3,5-t-butyl-4-hydroxylphenyl)]propionate

TABLE 6

| | Additive | 190° C. quantity (%) | 190° C. induction period | 250° C. quantity (%) | 250° C. induction period |
|---|---|---|---|---|---|
| Inventive Example 8 | NCHRO | 1.0 | 8'36" | 1.0 | 5'30" |
| Comparative Example 7 | metal soap/oxidation inhibitor (D1) | 0.1/0.1 | 2'36" | 0.1/0.1 | 2'12" |
| Comparative Example 8 | oxidation inhibitor (D2) | 0.1 | 4'36" | 0.1 | 1'48" |

Note
NCHRO: Naphtha cracking hydrogenated residual oil having initial 233° C. and 95% 357° C. fraction
Metal soap: Stearic acid calcium
Oxidation inhibitor (D1): Pentaerythtyl-tetrakis[3-(3,5-t-butyl-4-hydroxylphenyl)]propionate
Oxidation inhibitor (D2): Di-laulyl-3,3'-4-thiodipropionate

TABLE 7

| | Additive | 280° C. quantity (%) | 280° C. induction period |
|---|---|---|---|
| Inventive Example 9 | HAO | 0.5 | 3'40" |
| Inventive Example 10 | HAO | 3.0 | 6'30" |
| Comparative Example 9 | none | — | 1'06" |
| Comparative Example 10 | oxidation inhibitor (D) | 0.5 | 2'12" |

Note
HAO: Hydrogenated anthracene oil
Oxidation inhibitor (D): 1,3,5-trimethyl-2,4,6-tris(3-t-butyl-4-hydroxylbenzyl)benzene

TABLE 8

| | Amount of (B) (weight parts) | Amount of (D) (weight parts) | Induction Period 160° C. | 190° C. | 210° C. |
|---|---|---|---|---|---|
| Inventive Example 11 | 5 | — | 55'30" | >60' | >60' |
| Inventive Example 12 | 5 | — | >60' | 30'11" | 0'30" |
| Comparative Example 11 | — | 0.05 | 4'48" | 5'21" | 3'22" |
| Comparative Example 12 | — | 0.05 | 6'20" | 5'12" | 4'30" |

Note
Atmosphere: O$_2$
Component (A): Linear chain low density polyethylene
Component (B): (B1)
Component (D): [2.6 di-butyl-4-methyl phenol]
Amount: Per 100 parts (A)

TABLE 9

|  | Amount of (B) (weight parts) | Amount of (D) (weight parts) | Induction Period 160° C. | 190° C. | 210° C. |
|---|---|---|---|---|---|
| Inventive Example 13 | 1 | — | >60' | >60' | >60' |
| Inventive Example 14 | 1 | 0.05 | >60' | >60' | >60' |
| Comparative Example 13 | — | — | 40'02" | 6'33" | 4'34" |
| Comparative Example 14 | — | 0.05 | >60' | >60' | 20'28" |

Note
Atmosphere: $N_2$
Component (A): Linear chain low density polyethylene
Component (B): (B1)
Component (D): [2,6-di-butyl-4-methyl phenol]
Amount: Per 100 parts (A)

TABLE 10

|  | Amount of (B) (weight parts) | Radiation (Mrad) at room temperature | | | | | | |
|---|---|---|---|---|---|---|---|---|
|  |  | 0 (no radiation) | 1 Immediately after | 1 one month after | 2.5 Immediately after | 2.5 one month after | 5 Immediately after | 5 one month after |
| Inventive Example 15 | 1 | 1130 | 1120 | 1190 | 1060 | 1130 | 1250 | 1230 |
| Inventive Example 16 | 5 | 1190 | 1250 | 1180 | 1190 | 1150 | 1220 | 1230 |
| Comparative Example 15 | — | 1150 | 1180 | 1080 | 1040 | 990 | 1160 | 950 |

Note
Numerical values: Draw ratio (%) at break point
Component (A): High density polyethylene
Component (B): (B2)
Amount: Per 100 parts (A)

TABLE 11

|  | Amount of (B) (weight parts) | UV radiation (hr.) 0 | 100 | 200 | 300 | 400 |
|---|---|---|---|---|---|---|
| Inventive Example 17 | 0.1 | 650 | 20 | 30 | 30 | 20 |
| Inventive Example 18 | 5 | 860 | 400 | 580 | 370 | 520 |
| Comparative Example 16 | — | 240 | 20 | 20 | 20 | 10 |

Note
Numerical values: Draw ratio (%) at break point
Component (A): polypropylene
Component (B): (B2)
Amount: Per 100 parts (A)

TABLE 12

|  | Amount of (B) (weight parts) | Amount of (D) (weight parts) | Induction Period 280° C. |
|---|---|---|---|
| Inventive Example 19 | 1 | 0 | 3'01" |
| Inventive Example 20 | 3 | 0 | 7'40" |
| Comparative Example 17 | — | 0 | 1'11" |
| Comparative Example 18 | — | 0.5 | 2'20" |

Note
Atmosphere: $N^2$
Component (A): Linear chain low density polyethylene
Component (B): (B1)
Component (D): [1,3,5-trimethyl-2,4,6-tris(3-t-butyl-4-hydroxybenzyl)benzene]
Amount: Per 100 parts (A)

TABLE 13

|  | Component (A) Component (A) | Component (A) Amount | Component (B) Component (B) | Component (B) Amount | Component (C) Component (C) | Component (C) Amount | Component (D) Component (D) | Component (D) Amount | Thermal deterioration (min.) | draw breaks (No. of times/ 8 hrs) | gumming (mg/2.5 hrs) |
|---|---|---|---|---|---|---|---|---|---|---|---|
| Inventive Example 21 | HDPE | 100 | (b1) | 1.0 | H-1 | 0.25 | — | — | >60 | 1.0 | 1.3 |
| Inventive Example 22 | " | " | " | 1.0 | H-2 | 0.06 | — | — | >60 | 1.4 | 1.5 |
| Inventive Example 23 | " | " | " | 1.0 | H-1 H-3 | 0.15 0.15 | — | — | >60 | 1.2 | 1.0 |
| Inventive Example 24 | " | " | (b2) | 0.5 | H-1 | 0.25 | AO-1 | 0.1 | 21 | 1.3 | 1.2 |
| Inventive Example 25 | " | " | " | 0.5 | H-1 H-2 | 0.15 0.10 | AO-3 | 0.05 | 43 | 0.8 | 1.0 |
| Inventive Example 26 | " | " | " | 0.5 | H-1 H-3 | 0.15 0.15 | AO-2 | 0.1 | 36 | 1.3 | 1.4 |
| Comparative Example 19 | " | " | — | — | H-1 | 0.25 | AO-1 AO-2 | 0.1 0.1 | 3 | 2.5 | 3.0 |

TABLE 14

|  | Component (A) | | Component (B) | | Component (C) | | Component (D) | | Thermal deterioration (min.) | draw irregularities (hrs.) |
| --- | --- | --- | --- | --- | --- | --- | --- | --- | --- | --- |
|  | Component (A) | Amount | Component (B) | Amount | Component (C) | Amount | Component (D) | Amount | | |
| Inventive Example 27 | PP/HDPE | 80/20 | (b3) | 1.0 | H-1 | 0.25 | — | — | 5.0 | >8 |
| Inventive Example 28 | " | " | " | 1.0 | H-2 | 0.10 | — | — | 6.2 | " |
| Inventive Example 29 | " | " | " | 1.0 | H-1<br>H-2 | 0.25<br>0.10 | — | — | 7.0 | " |
| Inventive Example 30 | " | " | " | 0.5 | H-1 | 0.25 | AO-3 | 0.05 | 4.3 | " |
| Comparative Example 20 | " | " | — | — | H-1 | 0.25 | AO-1 | 0.2 | 1.6 | 0.3 |

Note to Table 13 and Table 14
(b1): anthracene hydrogenated oil
(b2): cracked naphtha crude hydrogenated oil
(b3): creosorte hydrogenated oil
H-1: calcium stearate
H-2: hydrotalcite
H-3: stearic acid
AO-1: tetrakis-[methylene-3-(3',5'-di-t-butyl-4'-hydroxyphenyl)propionate]methane
AO-2: dilaurylthiodipropionate
AO-3: di(2,4-di-t-butylphenyl)pentaerythritol diphosphite
recipe: by weight part

What is claimed is:

1. A thermoplastic resin composition which comprises 100 parts by weight of a thermoplastic resin (A) and 0.01–40 parts by weight of a hydrogen donative material (B) selected from at least one of hydrogenated oils resulting from hydrogenation of coal tar or fractionates thereof, hydrogenated petroleum oil fractions boiling at above 200° C. produced by thermal cracking, catalytic cracking or catalytic reforming, hydrogenated pitches boiling at 160°–550° C. resulting from hydrogenation of petroleum heavy oil and/or petroleum heavy oil having undergone a primary heat treatment, and fractions boiling at 160°–550° C. of hydrogenated pitches which have undergone a secondary heat treatment.

2. A thermoplastic resin composition according to claim 1 wherein said hydrogen donative material or Component (B) contains compounds resulting from hydrogenation of a compound having a dicyclic or greater aromatic ring or a compound having one aromatic ring and one unsaturated 5-member ring, or a mixture of said compounds.

3. A thermoplastic resin composition according to claim 1 wherein said hydrogenated tar or fractionates thereof results from the hydrogenation of an oil selected from the group consisting of treated oil, anthracene oil, tar oil, carvol oil, naphthalene oil, pitch oil, creosote oil, liquefied coal tar oil and mixtures thereof.

4. A thermoplastic resin composition according to claim 1 wherein said hydrogenated petroleum oil fractions result from the hydrogenation of an oil selected from the group consisting of a thermally cracked naphtha oil, catalytically cracked cycle oil, slurry oil, decanted oil (DCO), catalytically reformed naphtha residual oil, cracked crude oil tar and mixtures thereof.

5. A thermoplastic resin composition according to claims 1, 2, 3 or 4 wherein said hydrogen donative material has a hydrogen transfer to a hydrogen acceptor of at least 0.1 atoms/molecule at 350° C.

6. A thermoplastic resin composition according to claims 1, 2, 3 or 4 wherein said resin (A) is an olefinic polymer.

7. A thermoplastic resin composition according to claim 6, further including 0.01–5 weight parts of at least one of Components (C) selected from the group consisting of metal salts of aliphatic acids and hydrotalcites.

8. A thermoplastic resin composition according to claim 7 wherein said Component (C) is added in an amount of 0.01–10 weight parts per 100 weight parts resin (A).

9. A thermoplastic resin composition according to claims 1, 2, 3 or 4 further including 0.01–20 weight parts of at least one of Components (D) selected from the group consisting of hindered phenol-based, phosphorus-based, thioether-based and amine-based oxidation inhibitors.

10. A thermoplastic resin composition according to claims 7 or 8, further including 0.01–5 weight parts of at least one of Components (D) selected from the group consisting of hindered phenol-based, phosphorus-based and thioether-based oxidation inhibitors.

* * * * *